1,617,402

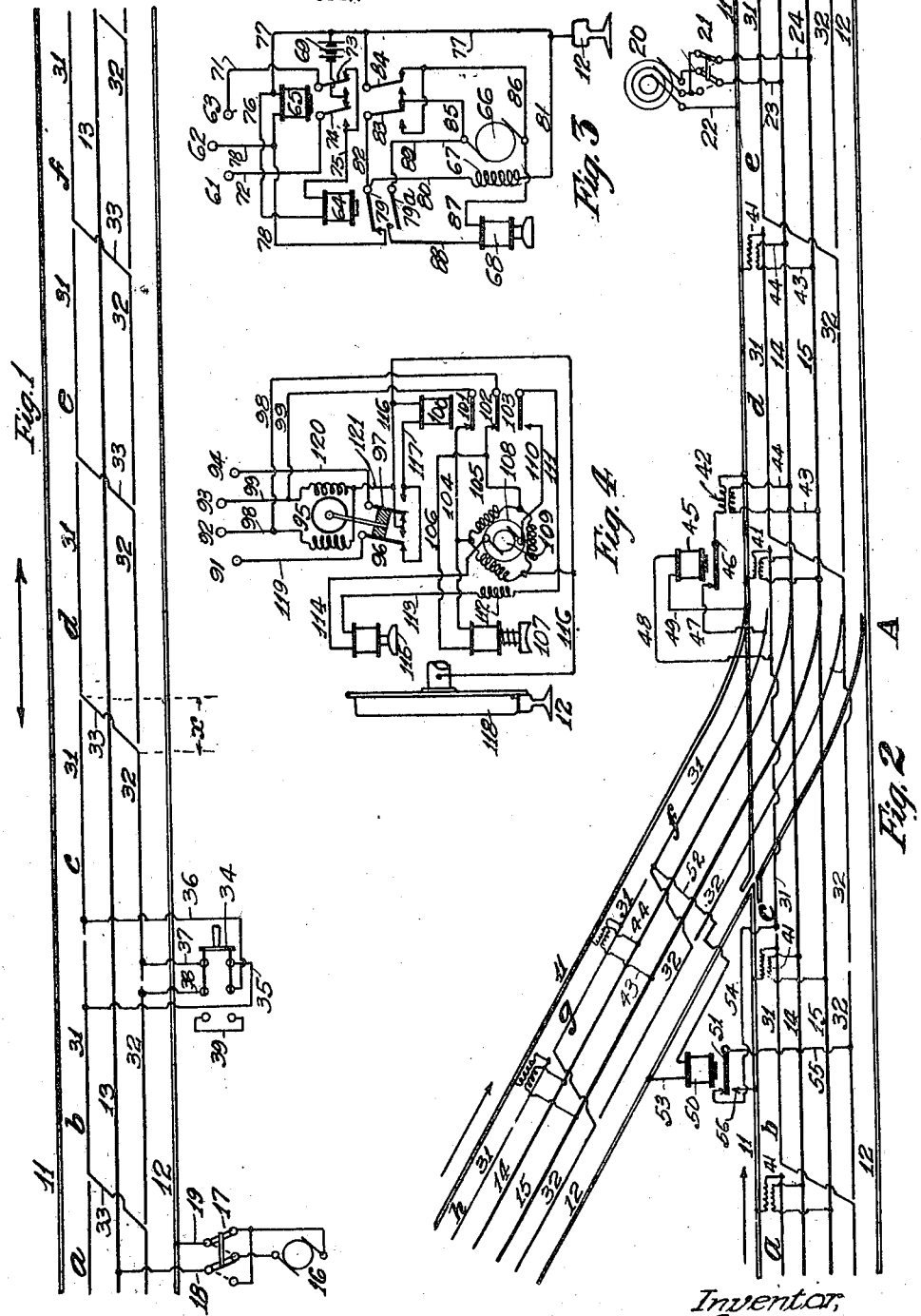
Feb. 15, 1927.
M. H. LOUGHRIDGE
BLOCK SYSTEM
Original Filed May 8, 1920
1,617,402
Inventor,
Matthew H. Loughridge Patented Feb. 15, 1927.

UNITED STATES PATENT OFFICE.

MATTHEW H. LOUGHRIDGE, OF BOGOTA, NEW JERSEY.

BLOCK SYSTEM.

Application filed May 8, 1920, Serial No. 379,708. Renewed December 22, 1923.

This invention relates to railroads and particularly to block system for railroads and has for its object to provide a block system without moving elements on the track; a system in which block lengths can be varied with comparatively little expense; a system that can be easily adapted to varying conditions of grades and curves; a system that is adapted for automatically controlling cars or locomotives by operating controlling elements in the cars themselves and a system that may be adapted for traffic in either direction. Other objects will appear from the following specification and drawings in which Fig. 1 shows a track layout using this invention and operated by direct current. Fig. 2 is a corresponding track layout operated by three phase alternating current. Fig. 3 shows the car wiring for operation in connection with Fig. 1 and Fig. 4 shows the car wiring which may be used in connection with Fig. 2.

This invention may be used for an automatic carrier system such as described in U. S. Patent 1,381,317, issued June 14, 1921, or it may be used as a block system for controlling standard railroad equipment.

This invention consists in providing on the track a forward block wire and a rear block wire extending throughout the length of each block; a contacting device is carried on the cars making contact independently with each of these block wires. The forward block wire controls a relay on the car which, in turn, controls the power to the car and determines, according to the conditions of the block, whether the car shall proceed or stop. The rear block wire transmits an effect from the car to the block in the rear for the purpose of controlling cars in the rear block. The arrangement is such that the rear block wire for one block becomes the forward block wire for the next block in the rear and the limit of each block is determined simply by changing the function of these wires. These wires are placed on either side of the centre line of the track and their function is changed by crossing over the centre line of the track. The rear block wire through the forward block wire thus controls the controlling relay on the car in the rear block, thereby cutting off its energy and causing the brakes to be applied.

Referring to Fig. 1, 11 and 12 are the track rails; 13 represents the power conductor fed from the generator 16 through the reversing switch 17 and connection 18, the return connection being obtained from conductor 19 and the track rail 12. This energizes power conductor 13 with a definite polarity according to the position of switch 17. The blocks are represented by the letters a, b, c, d, e and f. The rear block wire is indicated by 31 and the forward block wire by 32. At the termination of the block, the rear block wire and the forward block wire are connected by jumper 33.

The locomotive or car wiring used in connection with this layout as shown in Fig. 3, has contact shoes 61, 62 and 63, making contact, respectively with wires 31, 13 and 32. Contact 62 energizes polarized relay 65 by connection 78 and ground connection 77 to rail 12, also by connection 78 and contact 79 of relay 64 deenergized, and wires 80 and 81, field coil 67 of motor 66 is energized; also by wire 82 from contact 79 and contact 83 of polarized relay 65, wire 85, armature 66, wire 86, contact 84 of polarized relay 65 and wire 77 to rail 12, the propulsion motor 66 is energized to drive car in a definite direction.

When switch 17 is reversed changing polarity of power conductor 13, the contact fingers of polarized relay 65 are changed to the opposite position. This will cause the propulsion motor 66 to run in the reverse direction by reversing the current to the field coil 67 with relation to the current in the armature 66. This can be traced through wire 82, contact 83 reversed, wire 86, motor armature 66, wire 85, contact 84 reversed and wire 77 to rail 12, thus maintaining a constant current to the armature while the current to the field coil is reversed by switch 17, causing motor to run in reverse direction.

Contact 63 connecting with the forward block wire controls block relay 64 by connection 71, contact finger 73, wire 75, relay 64, wires 76 and 77 to rail 12. Hence if the forward block wire is energized relay 64 will be energized opening contact 79 and thereby cutting off the power from the operating motor 66. In addition, the circuit of brake magnet 68 is established through contact 79ª and wires 88 and 89; brushes of motor 66 and wire 87 thereby applying the brakes by means of regenerated current until the car stops. The contact 61 connecting with the rear block wire by connection 72 and contact 74 of polarized relay 65 connects to battery 69 and to ground by wire 77. It will be noted, therefore, that with polarized relay 65 in the position shown and contact 61 connecting with wire 31 and contact 63 connecting with wire 32, a car for instance in block 'e' will energize wire 31, also wire 32 in block 'd' will be energized. Now another car entering block 'd' will pick up current from the forward block wire 32, thereby energizing relay 64 cutting off power from this car and applying the brakes until the car in block 'e' passes into block 'f'. As soon as block 'e' is cleared wires 31 and 32 are de-energized and the car in block 'd' can proceed in the usual way. This condition is maintained throughout each block.

If the polarity in conductor 13 is changed so that the position of polarized relay 65 is changed, this will automatically change around the functions of contacts 61 and 63 and while the car proceeds in the opposite direction the block system will function in the proper manner. In this case contact 61 by connection 72, contact 74 and wire 75 controls the block relay 64 while contact 63 by wire 71 and contact 73 connects with battery 69. Hence in running in the opposite direction wire 32 becomes the rear block wire and wire 31 becomes the forward block wire so that the system automatically adapts itself to cars running in either direction without change in the arrangement of the track apparatus.

By this arrangement it will be noted that the termination of a block is accomplished simply by jumping the rear and forward block wires together which, in the layout, are placed on opposite sides of the power conductor. It is therefore, inexpensive to increase or decrease the number or lengths of block to any extent desired. Moreover, these blocks may be varied manually or by any other means desired. For instance, the double pole, double throw switch 34 may be used for this purpose. When in the position shown the blocks 'b' and 'c' are connected together as one unit by wires 35 and 36 connecting to wires 31 of each block and wires 37 and 38 connecting to wire 32 of each block. When this switch is reversed these connections are opened and jumper 39 connects wire 32 of block 'b' with wire 31 of block 'c' which corresponds to the arrangement of the other blocks.

It will be noted that the end of the rear block wire and the end of the forward block wire are placed in staggered relation across the track, the jumper 33 being obliquely shown on this account. The amount of this stagger is indicated by 'x' and amounts to an overlap on the block system. For instance, a car must enter the next block a distance corresponding to 'x' before it will clear the forward block wire 32 of the block preceding the last succeeding block. If, therefore, the actual braking distance is represented by the length of block shown there will be a margin of safety on this braking distance corresponding to the length of the overlap.

The arrangement in Fig. 2 is designed for operation on three phase alternating current and differs from the arrangement in Fig. 1 in that the block system operates on the closed circuit principle instead of the open circuit principle. An arrangement is also shown in this layout to prevent complication of cars entering the main track from a branch track.

The three phase generator 20 feeds the power conductors 14 and 15 through the pole changing switch 21 by connections 23 and 24. The third phase is obtained from connection 22 to rail 11. Since this arrangement is designed to work on the closed circuit principle the block wire is maintained energized to establish running conditions and is de-energized by the presence of a car in the block ahead. The transformer 41 having a primary connected by wires 43 and 44 to the power mains 14 and 15 feeds the rear block wire 31 of each block thus maintaining this wire and the forward block wire normally energized.

The car wiring as shown in Fig. 4 has contacts 91, 92, 93 and 94 connecting respectively with wires 32, 15, 14 and 31, contacts 92 and 93 connecting to power wires 15 and 14 operate the three phase propulsion motor 108 by connections 98 and 99 contacts 101 and 102 of block relay 100 and wires 104 and 105 to motor 108, the third phase being obtained through wire 116 which grounds to rail 12 through wheel 118. Direction in which cars will run is determined by the phase relation in wires 14 and 15 which is controlled by switch 21. Hence, if switch 21 is reversed, motor 108 will run in the reverse direction driving the car in the reverse direction.

Contact 91 connecting to the forward block wire 32 by connections 119, contact 96 and wire 117 controls block relay 100 which connects to ground on wire 116. Thus while the forward block wire is energized relay 100 is energized closing contacts 101 and 102 and maintaining the power of motor 108. On the other hand, when the forward block wire is deenergized, block relay 100 is de-energized cutting off the power of motor 108 and energizing brake magnet 115 operated by the direct current motor 109 on the shaft motor 108 through connection 110, contact 103 of relay de-energized, wire 111, field 112 of motor 109, wire 113, brake magnet and wire 114 to motor armature. In order to prevent cars from creeping forward on a grade, an additional brake magnet 107 is provided. In this magnet the brake is applied by a spring action and is held released by the propulsion current from wires 98 and 99 through contacts 101 and 102 to relay 100 and wires 104 and 106 to brake magnet. Hence, when the block relay is de-energized this brake is also applied and remains applied after the car stops.

Contact 94 connecting with the rear block wire 31 through connection 120, contact 97 and wire 116 is grounded to the rail 12. These wires therefore, ground the rear block wire and the forward block wire for the block in the rear thereby de-energizing these wires and causing the block relay of a car entering the rear block to the de-energized, thereby stopping the car until the block ahead is cleared.

When the system is changed for reverse running, arrangements are made in the car wiring to change about the function of contacts 91 and 94, thus making the block system effective in a similar manner to that described in connection with Fig. 1. For this purpose a poly-phase relay 95 is provided having an armature which swings according to the phase relation in wires 14 and 15 and corresponds to the operation of the polarized relay 65. With switch 21 reversed, contact 91 through connection 119, contact finger 96 reversed and wire 116 is grounded on rail 12, and contact 94 through connection 120 contact finger 97 reversed and wire 117 controls block relay 100. When running reversed therefore, contact 91 grounds wire 32 thereby grounding transformer 41 and preventing block relay in a following car in the next block from being energized. It will be noted that the transformer 41 is energized through the power wires 14 and 15. If therefore, a phase is lost this transformer will be de-energized causing an effect equivalent to a car in the block.

When cars are running on the main track as closely as the capacity of the block system will permit, it is desirable that cars from connecting tracks should not conflict with those on the main track. For this purpose the cars on the main track are arranged to block cars on the connecting track in rear of the connecting switch 'A', for instance, in Fig. 2, and, on the other hand, when the car on the connecting track proceeds to the main track it blocks cars on the main track approaching the switch. For this purpose the forward block wire for block 'b' is controlled by relay 50 through wire 55, contact 51 and wire 54 connecting to the rear block wire 31 of block 'c'. With a car in block 'f' wire 31 is grounded, relay 50 connecting by wires 52 and 53 between this wire and track 12 is de-energized and forward block wire 32 for block 'b' is grounded by connection 56 to rail 11. Hence, a car in the main track is stopped on block 'b' while a car is approaching from connecting track in block 'f'. On the other hand, a car in block 'c' grounds wire 31 which de-energizes relay 45 connected by wires 48 and 49 between this wire and track 11. This in turn de-energizes the forward block wire 32 in block 'g' by disconnecting transformer 42 through contact 46 and wire 47 thereby holding a car in this block while a car occupies block 'c' on the main line.

It will be observed that this arrangement provides a block system which permits of the utmost capacity in the track without increasing the expense; provides for most of the apparatus on the cars where it can be easily inspected and can be readily adapted to conditions of railroad service either as an automatic carrier or as a block system for controlling trains on a standard railroad.

Having thus described my invention, I claim:

1. A block system for a railway track operated automatically, comprising a forward block wire and a rear block wire extending along said track and dividing said track into blocks, a continuous power wire on said track, cars running on said track operated in multiple circuit from said wire, means included in each car coacting with said block wires, without the co-operation of moving devices located on the track, for automatically cutting off the power to said cars when they come within a predetermined distance of cars ahead and for automatically applying the power when this distance is exceeded.

2. A block system for a railway track operated automatically comprising a forward block wire and a rear block wire extending along said track and dividing said track into blocks and energized when the block is clear, a continuous power wire on said track, cars running on said track operated in multiple circuit from said power wire, a relay in each car arranged to apply and cut-off the power to said cars, said relay controlled by one of said block wires and means in said cars controlling the other of said block wires to operate said relay in another car, said means controlling said cars without the co-operation of moving devices located on the track.

3. A block system for railways including a track, a forward and a rear block wire on said track dividing said track into blocks, said forward block wire connected to the rear block wire of the adjoining block, a power wire on said track, a transformer connected with said power wire energizing one of said block wires, cars on said track having a controlling device operated by the energy in said block wire, said device, when energized, permitting said car to proceed and when deenergized retarding said car.

4. A block system for a railway track operated automatically, comprising a forward block wire in one vertical plane and a rear block wire in a different vertical plane extending along said track and dividing said track into blocks, a continuous power wire on said track, cars on said track operated in multiple circuit from said power wire, a shoe on said cars connecting with said forward block wire and another shoe connecting with said rear block wire, said forward block wire establishing conditions permitting said cars to proceed and said rear block wire controlling the movement of a following car.

5. A block system including a railway track, a forward and a rear block wire dividing said track into blocks and energized when the block is clear, a continuous power wire on said track, cars on said track operated in multiple circuit from said power wire and controlled by said block wires and means on each car for grounding one of said block wires to the rail of the track.

6. A block system for railways including a track, a forward and a rear block wire on said track dividing said track into blocks, said forward block wire connected to the rear block wire of the adjoining block, means for connecting current to said wires, a three phase power system on said track, cars operated by said three phase power system, a controlling device on said cars responsive to the condition of said block wires and means for changing the direction of movement of said cars by changing the phase relation of said power system.

7. A block system for railways including a track, a forward and a rear block wire on said track dividing said track into blocks, said forward block wire connected to the rear block wire of the adjoining block, means for connecting current to said wires, a three phase power system on said track, cars operated by said three phase power system, a controlling device on said cars responsive to the condition of said block wires, means for changing the direction of movement of said cars by changing the phase relation of said power system and means on said cars automatically adjusting the block system to the direction of movement of said cars.

8. A block system for railways including a track, a forward and a rear block wire on said track dividing said track into blocks, said forward block wire permanently connected to the rear block wire of the adjoining block, means for energizing one of said block wires, cars on said track having means of propulsion and means whereby said cars can proceed only when said block wire is energized.

9. A block system including a railway track, a plurality of block wires dividing said track into blocks, cars on said track having a braking system and a power system, means on said cars co-operating with each of said block wires without the co-operation of moving devices located on the track for applying the power and for releasing the braking system on said cars.

10. A block system including a railway track, a plurality of block wires dividing said track into blocks, a continuous power wire on said track, cars running in either direction on said track operated in multiple circuit from said power wire, a device on said cars responsive to the current in said block wires, means including said power wire for controlling the direction of running of said cars, said block wires maintaining the spacing of said cars when running in either direction.

11. A block system including a track, a plurality of block wires dividing said track into blocks, cars on said track each having a propulsion and braking system, means on said cars co-operating independently with each of said block wires, one of said block wires when energized releasing the braking system on said cars without the co-operation of moving devices on the track and the other of said wires correspondingly controlling a car in the rear.

12. A block system including a railway track, cars running on said track and each having a propulsion and braking system, block wires dividing said track into blocks and controlling, without the co-operation of moving devices on the track, said propulsion and braking system and means for making said braking system effective when said propulsion system is deenergized.

13. A block system including a railway track, cars running on said track and each having a propulsion and braking system, block wires dividing said track into blocks and controlling said propulsion and braking system without the co-operation of moving devices on the track and means for operating said braking system by the momentum of said car when said propulsion system is deenergized.

14. A block system having a track, cars running on said track, each having a propulsion and a braking system, a block wire dividing said track into blocks controlling said propulsion and braking system without the co-operation of moving devices on the track and means for operating said braking system automatically when said propulsion system is deenergized.

15. A block system including a main track and a connecting track, a forward and a rear block wire extending along each of said tracks and dividing said tracks into blocks, said forward block wire connected to the rear block wire of the adjoining block, a continuous power wire on said tracks, cars running on said tracks operated by current from said power wire, a device on said cars responsive to current in said block wires and means whereby a car on one of said tracks varies said block connections on the other track.

16. A block system including a railway track, a plurality of block wires dividing said track into blocks, cars running on said track and controlled by said block wires, means for changing the running direction of said cars and means in said cars for automatically adjusting the control of said block system to the particular direction of running established.

17. A block system including a railway track, a block wire on each side of the centre line of said track, cars running on said track and controlled by said block wires, a propulsion wire on said track for driving said cars, and means located on said cars and associated with said propulsion wire for automatically controlling the running direction of said cars.

18. A block system including a railway track, a block wire on each side of the centre line of said track, cars running on said track controlled by said block wires, a propulsion wire controlling the running direction of said cars and means in said cars co-acting with said propulsion wire for automatically adjusting said block system to the established direction of running.

19. In a block system including a track, the combination of a plurality of block wires dividing said track into blocks, cars running on said track by electric propulsion, a polarized relay on said cars responding to the power current for said cars, said relay controlling said block wires and said block wires controlling the spacing of said cars on said track.

20. A block system including a track, a plurality of block wires dividing said track into blocks, a power wire on said track energized by current having a particular characteristic, cars running on said track and operated by current from said power wire, a relay on said cars corresponding to the characteristics of said current, said relay controlling said block wires and said block wires controlling the spacing of said cars on said track.

21. A block system including a track, a plurality of block wires dividing said track into blocks, a continuous power wire on said track, cars running on said track and operated in multiple circuit by current from said power wire, a relay on said cars energized directly by said power wire, said relay controlling said block wires and said block wires controlling the spacing of said cars on said track.

22. A block system including a track, a plurality of block wires dividing said track into blocks, a power wire on said track energized by current having a particular characteristic, cars running on said track and operated by current from said power wire, a relay on said cars responsive to the characteristics of said current, a switch on the track for changing said characteristic, said relay controlling said block wires and said block wires controlling the spacing of said cars on said track.

23. A block system including a track, a plurality of block wires dividing said track into blocks, a power wire on said track, cars running on said track and operated by current from said power wire, a relay on said cars directly energized by said power wire, said relay controlling said block wires, means on the track including said power wire for controlling the running direction of said cars, and said block system controlling the spacing of said cars when running in either direction.

24. A block system including a track, a forward and a rear block wire on said track dividing said track into blocks, a continuous power wire on said track, cars running on said track, a block relay on said cars responsive to said block wires, a power relay on said cars responsive to the current in said continuous power wire, said power relay controlling the operation of said block relay by said block wires and said block wires controlling the spacing of said cars on said track.

25. A block system for railways including a track, a forward and a rear block wire dividing said track into blocks, said forward block wire connected to the rear block wire of the adjoining block, means on the track for energizing one of said wires, cars on said track having means of propulsion, a controlling device on said cars and means including said controlling device automatically operated whereby one of said block wires permit said cars to proceed and the other block wire retards the movement of a car in the following block.

26. A block system for railways including a track, a forward and a rear block wire dividing said track into blocks, said forward block wire connected to the rear block wire of the adjoining block, cars on said track having means of propulsion and a normally energized device controlling said propulsion means, and means including said block system whereby a car on the block ahead deenergizes said controlling device on a following car.

27. A block system for railways including a track, a forward and a rear block wire on said track dividing said track into blocks, said forward block wire connected to the rear block wire of the adjoining block, a three phase power system on said track, cars operated by said three phase power system, a controlling device on said cars responsive to said block system and means whereby said device sets up conditions to retard the progress of said cars when a phase of said propulsion system is lost.

28. A block system for railways including a track, a plurality of block wires on said track, cars on said track having a means of propulsion and a device controlling said propulsion means, said device controlled by said block wires, a plurality of braking devices on said cars and means whereby one of said braking devices is energized when said controlling device is energized and another braking device is energized when said controlling device is deenergized.

29. A block system for railways including a track, a plurality of block wires on said track, cars on said track having a means of propulsion and a device controlling said propulsion means, said device controlled by said block wires, a spring operated braking device on said cars and means whereby said braking device is held released when said controlling device is energized.

30. In a block system for railways including a track, the combination of a plurality of block wires on said track, cars on said track having a means of propulsion and a device controlling said propulsion means, said device controlled by said block wires, a spring operated braking device on said cars and means whereby said braking device is held released by said propulsion means.

31. A block system for railways including a track, a plurality of block wires on said track, cars on said track having a means of propulsion and a propulsion motor, a device controlling said motor, said device controlled by said block wires, a braking device on said cars operated by the dynamic energy from said motor and means whereby said braking device is adapted to be energized when said controlling device is deenergized.

32. A block system for railways including a track, a plurality of block wires on said track, cars on said track having a means of propulsion and a propulsion motor, a block relay controlling said motor and controlled by said block wires, a braking device on said cars, said block relay, when deenergized, establishing a circuit from said motor to said braking device.

33. A block system for railways including a track, said block system dividing said track into blocks, a propulsion system on said track, cars on said track having means of propulsion and a plurality of braking devices, a device on said cars responsive to said block system and controlling said propulsion system and means including said device whereby one of said braking devices is made effective by the presence of current in said propulsion system and the other braking device is made effective by the absence of current in said propulsion system.

MATTHEW H. LOUGHRIDGE.